United States Patent
Bigolin et al.

(10) Patent No.: US 11,613,050 B2
(45) Date of Patent: Mar. 28, 2023

(54) MALE COMPONENT AND RESPECTIVE MOULD UNIT FOR PRODUCING A VEHICLE SADDLE

(71) Applicant: SELLE ROYAL S.p.A., Pozzoleone (IT)

(72) Inventors: Barbara Bigolin, Vicenza (IT); Marco Malfatti, Vicenza (IT)

(73) Assignee: SELLE ROYAL S.P.A., Pozzoleone (IT)

( * ) Notice: Subject to any disclaimer, the term of this patent is extended or adjusted under 35 U.S.C. 154(b) by 0 days.

(21) Appl. No.: 16/969,270

(22) PCT Filed: Feb. 13, 2019

(86) PCT No.: PCT/IB2019/051147
§ 371 (c)(1),
(2) Date: Aug. 12, 2020

(87) PCT Pub. No.: WO2019/166900
PCT Pub. Date: Sep. 6, 2019

(65) Prior Publication Data
US 2021/0023747 A1    Jan. 28, 2021

(30) Foreign Application Priority Data
Feb. 28, 2018  (IT) .................. 102018000003144

(51) Int. Cl.
*B29C 33/40*     (2006.01)
*B62J 1/00*      (2006.01)
(Continued)

(52) U.S. Cl.
CPC .............. *B29C 33/40* (2013.01); *B29C 33/12* (2013.01); *B29C 33/306* (2013.01); *B29C 33/405* (2013.01); *B29C 33/565* (2013.01); *B29C 44/1233* (2013.01); *B29C 44/1257* (2013.01); *B29C 44/1271* (2013.01); *B29C 44/58* (2013.01); *B29C 45/03* (2013.01);
(Continued)

(58) Field of Classification Search
None
See application file for complete search history.

(56) References Cited

U.S. PATENT DOCUMENTS 3,539,144  A     11/1970  Krug
8,236,218  B2 *   8/2012  Terreni ................ B29C 44/1257
                                                        264/250

(Continued)

FOREIGN PATENT DOCUMENTS

EP    0653279 B1    4/1998
EP    1992467 A1 * 11/2008 ............. B29C 33/40
(Continued)

OTHER PUBLICATIONS

Shore durometer, Wikipedia, https://en.wikipedia.org/wiki/Shore_durometer, Nov. 15, 2021 (Year: 2021).*
(Continued)

*Primary Examiner* — Benjamin A Schiffman
(74) *Attorney, Agent, or Firm* — Tutunjian & Bitetto, P.C.

(57) ABSTRACT

The present invention relates to a male component or punch for a mould unit for producing a vehicle saddle.

17 Claims, 8 Drawing Sheets

(51) Int. Cl.
  *B29C 44/12* (2006.01)
  *B29C 44/58* (2006.01)
  *B29C 33/30* (2006.01)
  *B29C 33/56* (2006.01)
  *B29C 33/12* (2006.01)
  *B29C 45/03* (2006.01)
  B29C 45/14 (2006.01)
  B29L 31/30 (2006.01)
  *B62J 1/18* (2006.01)
  B29C 44/14 (2006.01)

(52) U.S. Cl.
  CPC .............. *B62J 1/00* (2013.01); *B29C 44/143* (2013.01); *B29C 45/14008* (2013.01); *B29C 2045/14155* (2013.01); *B29K 2713/00* (2013.01); *B29K 2863/00* (2013.01); *B29K 2867/00* (2013.01); *B29K 2875/00* (2013.01); *B29K 2883/00* (2013.01); *B29K 2995/007* (2013.01); *B29L 2031/3094* (2013.01); *B62J 1/18* (2013.01)

(56) References Cited

U.S. PATENT DOCUMENTS

| 9,004,894 B2* | 4/2015 | Tsai | B29C 45/37 425/116 |
| 2012/0171317 A1 | 7/2012 | Tsai et al. | |
| 2020/0180717 A1* | 6/2020 | Bigolin | B29C 33/18 |

FOREIGN PATENT DOCUMENTS

| GB | 1243225 A | 8/1971 | |
| WO | 2007020571 A1 | 2/2007 | |
| WO | WO-2020115587 A1 * | 6/2020 | B29C 33/34 |

OTHER PUBLICATIONS

Silicone rubber, Wikipedia, https://en.wikipedia.org/wiki/Silicone_rubber, Nov. 15, 2021 (Year: 2021).*
International Search Report for PCT/IB2019/051147 dated May 7, 2019 (3 pages).
International Preliminary Report on Patentability for PCT/IB2019/051147 dated May 26, 2020 (10 pages).

* cited by examiner

FIG. 14

MALE COMPONENT AND RESPECTIVE MOULD UNIT FOR PRODUCING A VEHICLE SADDLE

TECHNICAL FIELD OF THE INVENTION

The present invention relates to a male component or punch and a related mould unit for producing a vehicle saddle, e.g. bicycle or motorcycle saddles.

The present invention also relates to a method for obtaining a vehicle saddle.

BACKGROUND

The moulds of vehicle saddles, especially bicycle saddles, usually comprise a female component and a male component, which are displaceable relative to one another between a closing position and an opening position.

As is known, vehicle saddles often comprise a base felt or body which can be engaged, for example by means of a so-called "fork", with a seat post, a padding applied on the felt and a covering or cover wrapping the padding.

To manufacture such saddles, specific moulds have been proposed, for example as described in the European Patent Application published with the number EP0653279B1, or in the International Application published with the number WO2007020571A1.

This International Application discloses a mould comprising a female part and a male part pivoted with respect to one another between an opening and a closing position of the mould. This mould is specifically provided for the construction of a saddle having a sealing edge on the perimeter thereof.

The female part may comprise a first underlying plate which delimits part of the impression or cavity of the mould, an intermediate plate intended to form an undercut with respect to the cavity or impression of the mould, and a third removable overlying sealing plate intended to fix the covering or cover.

By contrast, the male part comprises a first male component and a second male component which can be used in subsequent steps of the moulding process.

In this respect, before moulding, a soft gasket can be applied on the perimeter of the felt to ensure a sealing between the felt and the second male component during moulding operations, and thus compensate for the deformations suffered by the felt during the latter, which deformations would cause a gap to open up between the second male component and the felt, resulting in an infiltration of the foam towards the centre of the saddle during the steps of forming the sealing edge on the perimeter of the saddle.

US2012171317A1 and GB1243225A disclose in general moulds for producing objects which have nothing in common with moulds for producing vehicle saddles.

SUMMARY OF THE INVENTION

An object of the present invention is to provide a new male component and a new mould unit of a vehicle saddle, e.g. bicycle or motorcycle saddles.

Another object of the present invention is to provide a male component and a mould unit which allow to manufacture easily and quickly a saddle as said above.

Another object of the present invention is to provide a male component and a mould unit which makes it possible to manufacture a vehicle saddle, without the need to apply gaskets to ensure the sealing between a felt of the saddle and components of the male component or of the mould unit, in particular, but not exclusively, to ensure the sealing between a felt and a second male component of a mould unit during the steps of forming a sealing edge on the perimeter of the saddle.

Another object of the present invention is to provide a method for moulding a vehicle saddle, e.g. bicycle or motorcycle saddles.

According to one aspect of the invention, a male component or punch according to the present application is provided.

The present application refers to preferred and advantageous examples of embodiments of the invention.

BRIEF DESCRIPTION OF THE DRAWINGS

Other features and advantages of the invention will be more apparent from the description of an exemplary embodiment of a male component of a mould unit, as well as of a felt to be used therein, illustrated by way of example in the accompanying drawings, wherein.

In the accompanying drawings, identical parts or components are distinguished by the same reference numerals.

DETAILED DESCRIPTION OF THE INVENTION

With reference to the appended figures, a male component or punch 1 for a mould unit 2 for producing a vehicle saddle SA, e.g. bicycle or motorcycle saddles, as well as backrests and seats for ergonomic chairs, specifically designed for the elderly and disabled, shoe insoles, orthopaedic and non-orthopaedic mattresses, has been illustrated.

The saddle SA obtainable using a male component 1 and a mould unit 2 in accordance with the present invention may comprise a felt or base F, a padding P formed, e.g. cast or moulded, for example by injection onto the felt F, and a covering or cover C which wraps the padding P externally.

In particular, the male component 1 according to the present invention and, especially, a respective mould unit 2 comprising, inter alia, the male component 1 and a female component or matrix 3, can be intended to form a peripheral portion, e.g. an annular one, for protecting the edge E of a bicycle or motorcycle saddle, notably the lower, in use, edge E. As will also be said later, uses other than the one stated herein may also be provided.

As far as the male component 1 is concerned in detail, specifically, it has a main base body 4 made of a first material, e.g. resin, such as a polyester resin or an epoxy resin, charged, if desired, with carbon or glass fibres or metal powders, or made of metal or a metal alloy.

The main base body 4 can have a hardness ranging from 90 to 100 Shore A.

Moreover, the male component 1 also comprises at least one insert or contact layer 5 formed or applied, e.g. moulded, glued, injected or engaged, or bolted, if desired, over the main base body 4, which insert or contact layer 5 is made of a second softer or more yielding, e.g. elastically yielding, material, than the first material.

The insert or contact layer 5 is preferably made of a second material selected from the group consisting of polyurethane resin or silicone.

Moreover, the insert or contact layer 5 can have a hardness ranging from 40 to 80 Shore A, e.g. 50-70 Shore A, or 60 Shore A.

Advantageously, the insert or contact layer 5 has a thickness ranging from 3 to 70 mm. Moreover, the insert or contact layer 5 has zones of different thicknesses.

More specifically, according to an exemplary embodiment, the insert or contact layer 5 is designed to completely or partly support, during the moulding, a felt or shell F for a saddle SA to be moulded, so as to absorb deformations, if any, and prevent the entrance of a moulding substance or foam between the felt F and the insert or contact layer 5, or between one or more portions of the felt F and the insert or contact layer 5. Basically, the insert or contact layer 5 delimits at least one central or intermediate portion of the inner, or moulding, or mould impression or cavity 15 delimiting surface 10 of the male component 1 to which a felt or shell F is engaged and abutted for a saddle SA to be moulded, i.e. intended to be engaged and abutted to a felt or shell F for a saddle SA to be moulded.

"Mould impression" or "mould cavity" refers to the area occupied by the saddle SA to be moulded once the moulding has been completed, therefore the area occupied by the components F, P, C of the saddle to be moulded which are placed in the mould unit 2 at the beginning of the moulding process, as well as the area where is injected or cast or placed the material to be moulded or overmoulded on the components of the saddle placed in the unit 2 at the beginning of the process.

Figure 1:
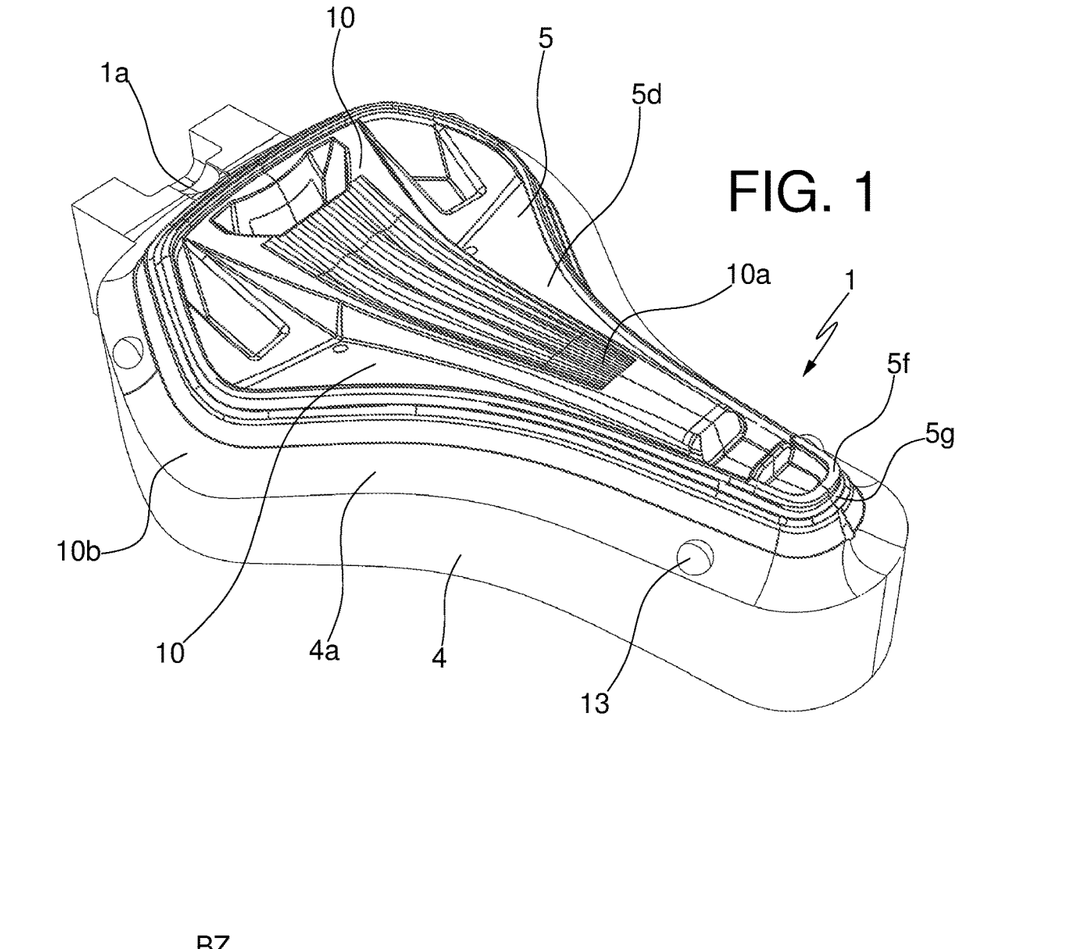
FIG. 1 is a perspective view partially from above of a male component according to the present invention.
Figure 2:
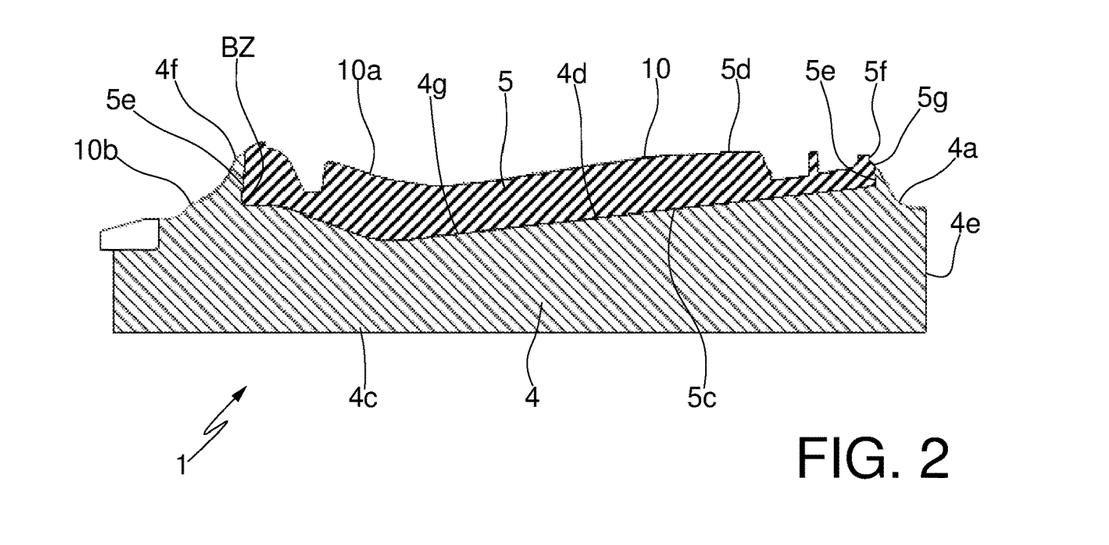
FIG. 2 is a sectional view of the male component of FIG. 1.
Figure 3:
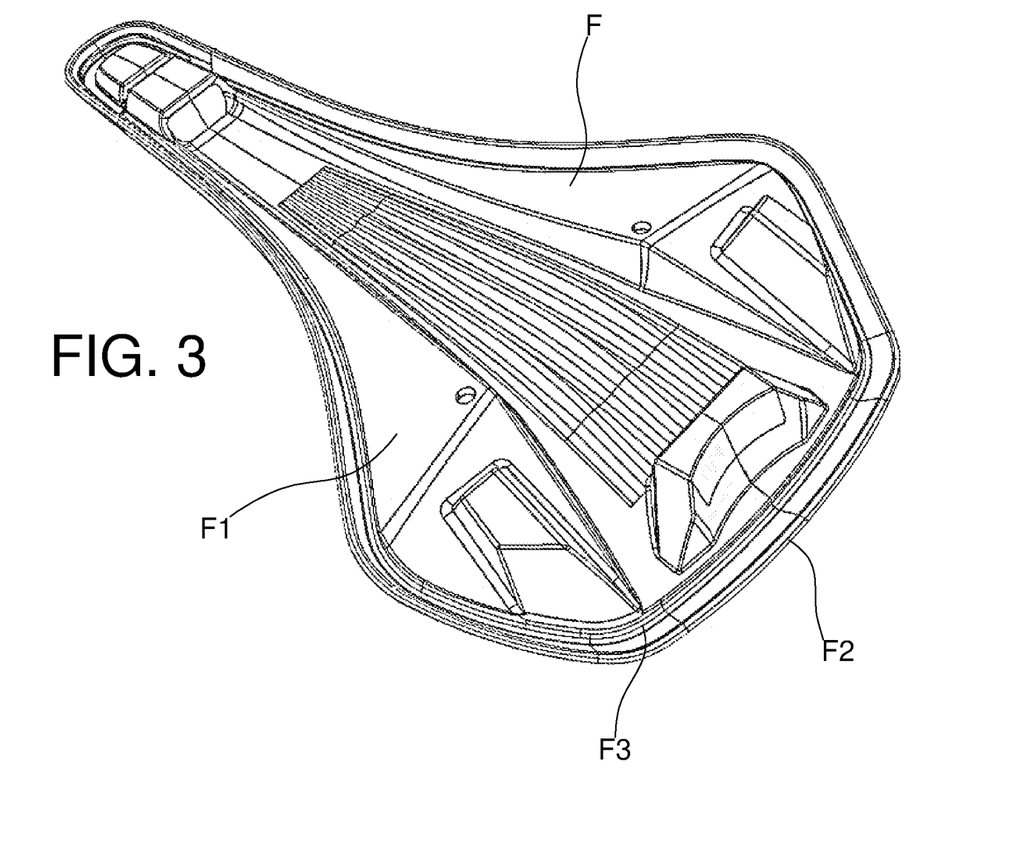
FIG. 3 is a perspective view partially from above of a felt usable as coupled with a male component according to the present invention.
Figure 4:
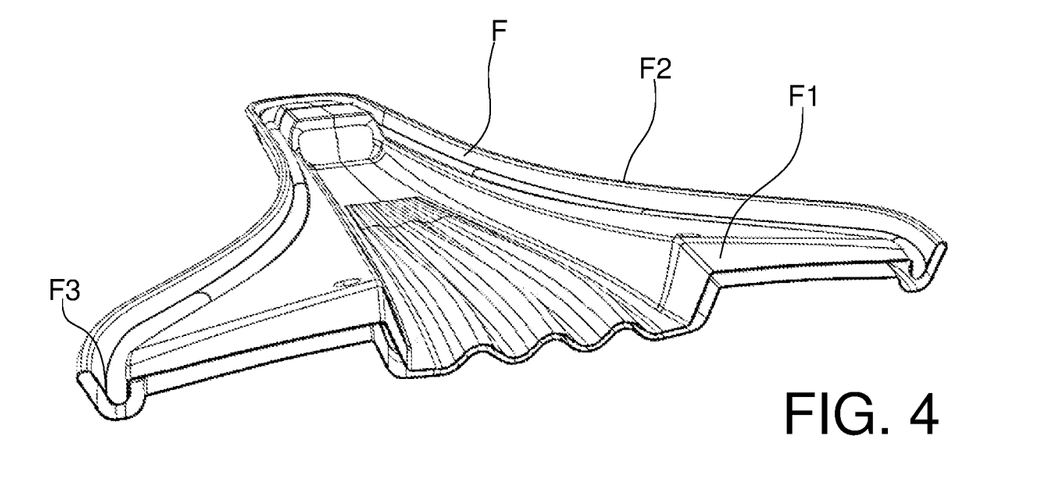
FIG. 4 is a sectional view of the felt of FIG. 3.
Figure 5:
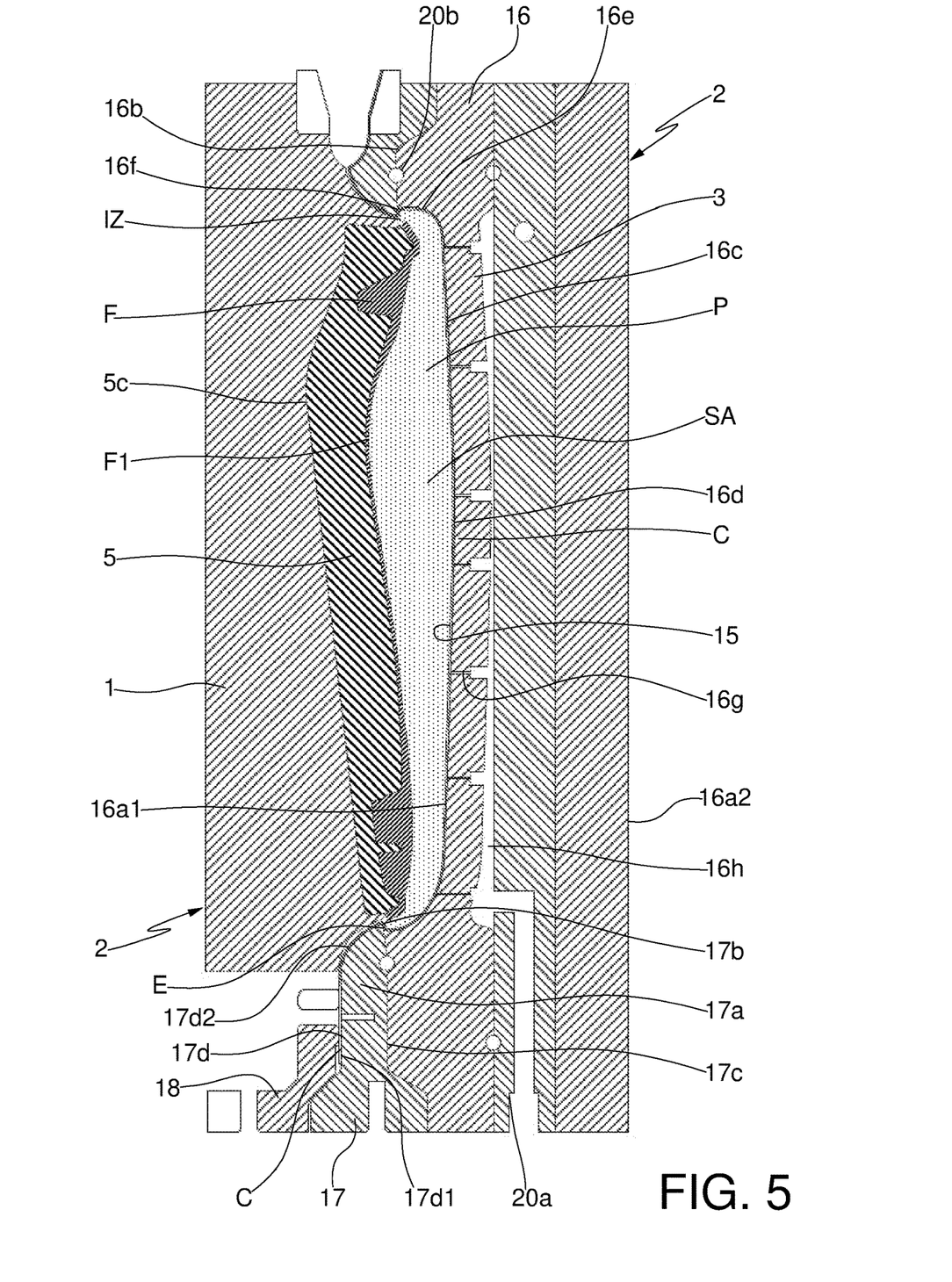
FIG. 5 is a sectional view of a mould unit according to the present invention in closing position.

In the case of a saddle SA, the mould impression 15 comprises the surface occupied, during moulding, by the felt F, the padding P and the covering C, as well as the gap or zone IZ (see especially FIG. 5) for the insertion or injection of a material designed to form a sealing edge or a peripheral section, e.g. an annular one, for protecting the edge E of a saddle SA.

Even more specifically, the lower, in use, surface F1 of the felt F can be coupled or substantially to size abutted on the inner surface 10 of the male component 1. Moreover, this coupling is ensured throughout whole the respective moulding step.

Thanks to its softness, the insert or contact layer 5 ensures, especially during moulding, the maintenance of contact with the felt F or with the respective part of the felt F (if the insert 5 has a free surface smaller than the lower, in use, surface F1 of the felt F) for the whole extension of the inner surface 10, or rather throughout whole the at least one central or intermediate portion 10a defined by the free surface of the insert or contact layer 5, even in the case of deformation (whether temporary or not) of the felt F.

The main base body 4 can also define an abutment and engagement edge 4a, e.g. an annular one, for the female component 3 of a respective mould unit 2, the abutment and engagement edge 4a enclosing or surrounding, at least with reference to a plan view of the male component 1, the insert or contact layer 5.

Basically, the male component 1 has a surface 10 being inner and facing the female component 3 of a mould unit 2 in moulding conditions, and such inner surface 10 comprises an outer portion 10b, e.g. an annular one, defined by the abutment and engagement edge 4a, as well as at least one central or intermediate portion 10a enclosed in the zone delimited by the abutment and engagement edge 4a and completely or partly defined by the free surface of the insert or contact layer 5.

The inner or moulding surface 10 or the surface for delimiting the mould or cavity impression 15 is then made of a portion 10a softer defined by the insert or contact layer 5 and of a portion 10b harder defined by the abutment and engagement edge 4a, which portion 10b encloses or is around the central or intermediate portion 10a.

The central or intermediate portion 10a defined by the free surface of the insert or contact layer 5 can constitute 5% to 100%, preferably 5% to 40%, or 50% to 90%, even more preferably 10% to 30%, or 60% to 80% of the inner surface 10.

The main base body 4 also delimits, preferably, a bowl or recessed zone BZ for positioning and engaging, e.g. positioning and bolting, moulding, gluing, injecting, the insert or contact layer 5. In this case, the insert or contact layer 5 is thus, in use, inserted or housed, even removably, if desired, e.g. to size or complementary, within the bowl zone BZ.

More specifically, the main base body 4 has a first rear face 4c, a first front face 4d and one or more first edge faces 4e. The terms rear and front refer to the distance from the mould impression 15 defined by the male component 1 with a female component 3.

The front face 4d comprises, from the outside towards the inside, or rather from the periphery towards the centre, the abutment and engagement edge 4a centrally ending in a raised wall 4f, e.g. an annular one, or parts of raised walls and then an inner or central portion 4g, slightly curved with the concavity facing the mould impression 15, if desired, which defines with the raised wall 4f the bowl or recessed zone BZ.

The insert or contact layer 5 has instead a second rear face 5c, a second front face 5d and one or more second edge faces 5e.

The insert 5 is also inserted or formed into the bowl or recessed zone BZ, its second rear face 5c being in contact with the inner or central portion 4g of the front face 4d, and the second edge faces 5e being in contact with the surface of the raised wall 4f defining the bowl or recessed zone BZ.

Moreover, the edge portion 5f of the insert 5 may be raised or protrude with respect to the raised wall 4f, so as to provide a part of fitting or engagement with an edge of a felt or shell F. In this regard, the height or the distance of the edge section 5f with respect to the rear face 4c of the main base body 4 may increase as moving closer to the centre or centre line of the insert 5.

If desired, the edge section 5f of the insert 5 also defines a step 5g, e.g. an annular one, to ensure a gripping point with the felt or shell F.

The outer face or surface (with reference to the bowl or recessed zone BZ) of the raised wall 4f is preferably aligned with the outer face or surface of the edge section 5f of the insert 5, i.e. the face or surface of the edge section 5f which is distal from the second rear face 5c.

If desired, the outer face or surface of the abutment and engagement edge 4a, as well as the respective raised wall 4f have a curved configuration with the concavity facing outwardly and, in use, towards the female component 3 of a mould unit 2.

Preferably, each recess in the inner surface 10 will delimit a zone corresponding to a protrusion at the lower, in use, surface F1 of the felt F, and each projection in the inner surface 10 will be insertable to size into a respective slot in the lower surface F1 of the felt F.

Moreover, the edge section 5f of the insert 5 will be fittable to size in a respective annular groove F3 delimited by the outer edge F2 of the felt F at the lower surface F1 thereof.

If desired, the male component 1 has also elements for the correct centring or positioning with respect to a female component.

In this regard, according to the embodiment illustrated in figures, the male component or punch 1 has one or more protruding elements 13, e.g. with a spherical configuration, each of which is designed to fit into or engage with a respective recessed element in the female component 3 of a mould unit 2.

The protruding elements 13 can be provided at or in the abutment and engagement edge 4a, and notably protruding from the face thereof facing, in use, the female component 3.

Obviously, protruding elements in the female component 3 and recessed elements in the male component 1 could be provided.

The male component or punch 1 can also have a portion of a channel for conveying 1a material to be injected within the mould impression 15, or rather into the space or zone IZ for inserting or injecting moulding material (if the male component 1 is a second male component as stated below).

As will be understood, the insert 5 could be in one piece or multiple inserts 5 could be provided, for example a plurality of inserts, if desired disposed as a "mosaic" so as to define the respective central or intermediate portion 10a.

Moreover, the insert 5 could delimit or have, at respective inner parts, housing zones for protrusions or projections of the main base body 2a made of resin, or in any case of the same material as the latter.

A further object of the present patent application is a mould unit 2 for producing a saddle SA for the human body, comprising a first male part 1, 12 and a second female part 14, mutually displaceable between at least one opening position of the mould unit 2, wherein parts of the saddle SA to be moulded, may be arranged in the unit 2, or wherein a saddle SA moulded in the unit 2, may be removed, and at least one closing position of the mould unit 2, wherein the male part 1, 12 and the female part 14 are coupled in one or more operating positions, so as to delimit at least one mould impression between them.

In this case, the male part can include a male component 1 as stated above, and the respective insert or contact layer 5 can substantially constitute the main inner surface of the male component 1 in the closing position, i.e. it constitutes the main section of the male component 1 including a containment or delimiting surface of the mould impression 15.

If desired, the male part comprises a first male component or first punch 12 and a second male component or second punch 1 usable in the subsequent steps of the moulding process, and the first and/or second male component 1 is as described above. In particular, as will be better explained below, during a moulding process at first the first male component 12 with the female part 14 is used, and then the second male component 1 with the female part 14 is used.

In the event that the first male has an insert made of a material softer than a respective main base body as stated above, this would ensure a better sealingness and cleanliness during the process.

The first 12 and the second 1 male component can be assembled or obtained on opposite faces of a same plate 12a, or be formed on different plates, which are, for example, engaged or pivoted with respect to one another or independent.

The first male component 12 may be similar to the second male component 1, but without the insert 5 or with an insert other than the one illustrated in figures and with a delimiting portion of a respective different mould impression, in particular with reference to the zone of the latter corresponding to the peripheral section, e.g. an annular one, for protecting the edge E of a saddle SA.

It will be appreciated that a male component according to the present invention could also be used for mould units comprising a single male component, instead of two male components as stated herein. In this case, the insert of such male component would be able to remain substantially adherent for a respective step to a component of the saddle to be produced, or also to a part of a female component, thus obtaining an improved airtightness and cleanliness.

Moreover, for a moulding method which currently provides two male components, only one male component according to the present invention, to which an insert 5 made of soft material is locally applied in a removable manner during the method, specifically at the time of the second moulding step (see also the description of the method set forth below), could be used.

As far as the female part is instead concerned, it delimits a wall of the impression or cavity 15 having a shape complementary to the external configuration, in use, of the padding P with the covering or cover.

More in detail, the female part 14 comprises a first, e.g. underlying, plate 16, defining with the male component the impression or cavity 15, a second intermediate plate 17, e.g. an annular one, intended to form an undercut with respect to the cavity 15, and a third removable sealing plate 18, which can be annular, too, if desired, being for example overlying and intended for removable fixing or locking of the covering or cover C during moulding.

The first plate 16 has a first face 16a1, in use, facing the male part 1, 12, and a second rear face 16a2.

The first face 16a1 has an annular abutment portion 16b, for example lying, at least for part of its extension, in a respective plane, as well as a delimiting portion 16c of the cavity 15 together with the male part, which is lowered with respect to the plane where the annular delimiting portion 16b lies. The delimiting portion 16c has, preferably, a concave configuration with the concavity facing outwards or, under moulding conditions, towards the male part 1, 12, and can have a substantially flat or slightly curved intermediate segment 16d and a lateral or tubular segment 16e departing from the intermediate segment and ending in a free end 16f.

The first plate 16 may have one or more channels 16g opening on one side in the impression or cavity 15 and on the other side in a duct or circuit 16h in fluid communication with a source of suction or vacuum, in order to allow to suck the covering or cover C (as will be better explained later) against the delimiting portion 16c.

The second plate 17 instead delimits a through slot which, at the side for the abutment to the first plate 16, has a first end 17a having a configuration substantially complementary to the free end 16d, but with slightly lower size than the latter, so that between the first end 17a and the free end 16d an inner shoulder 17b is delimited, i.e. facing the inside of the impression or cavity 15, which is intended to form an undercut in the saddle SA to be produced.

More particularly, the second annular plate 17 has at least one first main face 17c abutting against the first plate 16 and at least one second main face 17d, and the shoulder 17b constitutes a section of the inner edge (with reference to the mould impression 15) of the first main face 17c.

The second main face 17d has instead a first peripheral portion 17d1 for the engagement or abutment (partly with the covering C interposed) to the third plate 18, and a second central or intermediate portion 17d2 for the engagement or abutment (with the covering C interposed) to a respective portion of a male component 1, 12.

With particular reference to the second male component 1, the second central or intermediate portion 17d2 is intended to be engaged or abutted (with the covering C interposed) to the outer face or surface (with reference to the bowl or recessed zone BZ) of the abutment and engagement edge 4a and of the respective raised wall 4f.

Moreover, preferably, when the second male component 1 is closed adjacent to and against the female part 14 of the mould unit 2, and with the felt F, the padding P and the covering C within the mould impression 15, between the second central or intermediate portion 17d2, the outer face or surface of the abutment and engagement edge 4a and of the raised wall 4f a space or zone IZ is delimited for inserting or injecting a material designed to constitute a sealing edge or a peripheral section, e.g. an annular one, for protecting the edge E of a bicycle or motorcycle saddle, in particular the lower, in use, edge E thereof. Clearly, the zone IZ constitutes the sole inner zone of the unit 2 at which no contact between the second male component 1 and the female part 10 in a closing trim occurs.

More specifically, when the mould unit 2 is closed, a segment of the outer portion 10b of the inner surface 10 delimiting the mould impression 15, or rather of an edge of the mould impression 15, is not in contact with respective sections or walls of the female part 14, or with the felt F.

Even more particularly, when the mould unit 2 is closed, a segment, e.g. an annular one, of the external portion 10b of the inner surface 10 delimiting the lower, in use, edge E of a saddle SA is not in contact with respective sections or walls of the female part 14, or with the felt F.

The second central or intermediate portion 17d2 may be, for example, curved with the convexity facing outwards, or, in use, the male component 1, 12.

Referring now to the third removable sealing plate 18, as said, it has an annular configuration and delimits a through opening larger than the first or the second male component 1, 12, so that the latter can pass through it and engage (with the covering C interposed) the second plate 17. Basically, the opening delimited by the third removable sealing plate 18 is much larger than the outer size of the first or the second male component 1, 12.

The male 1, 12 and female 14 parts can be displaced, e.g. moved closer to or away from one another, or rotatably pivoted for mutual coupling in order to bring the mould unit 2 from at least one open condition or opening position to at least one closed condition or closing position of a respective mould impression (15 in the case of the second male component and the female part).

If desired, the components of the female part 14 can also be provided with a hole 20a, e.g. a threaded one, for connecting or screwing a fitting for a vacuum pipe, as well as gaskets or O-rings which can be housed in suitable seats 20b to prevent the vacuum effect from passing through the plates of the female part.

The components of the female part 14 can then also have channel or nozzle portions 14a for conveying a material to be injected into the mould impression.

Figure 6:
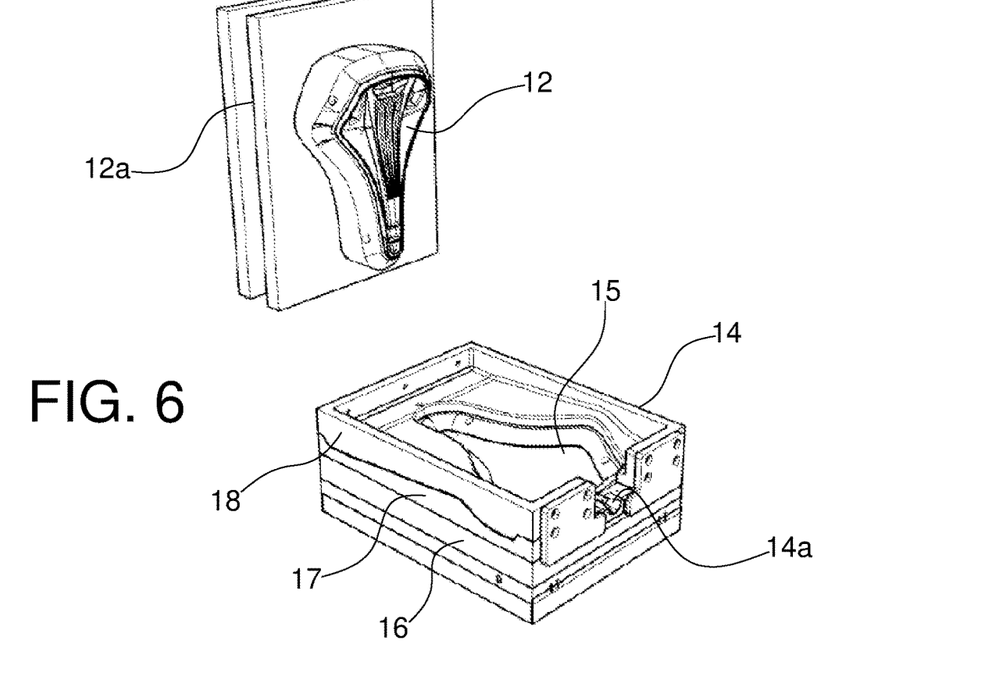
FIGS. 6 to 13 illustrate a mould unit according to the present invention in respective operation trims for carrying out the related moulding steps.
Figure 7:
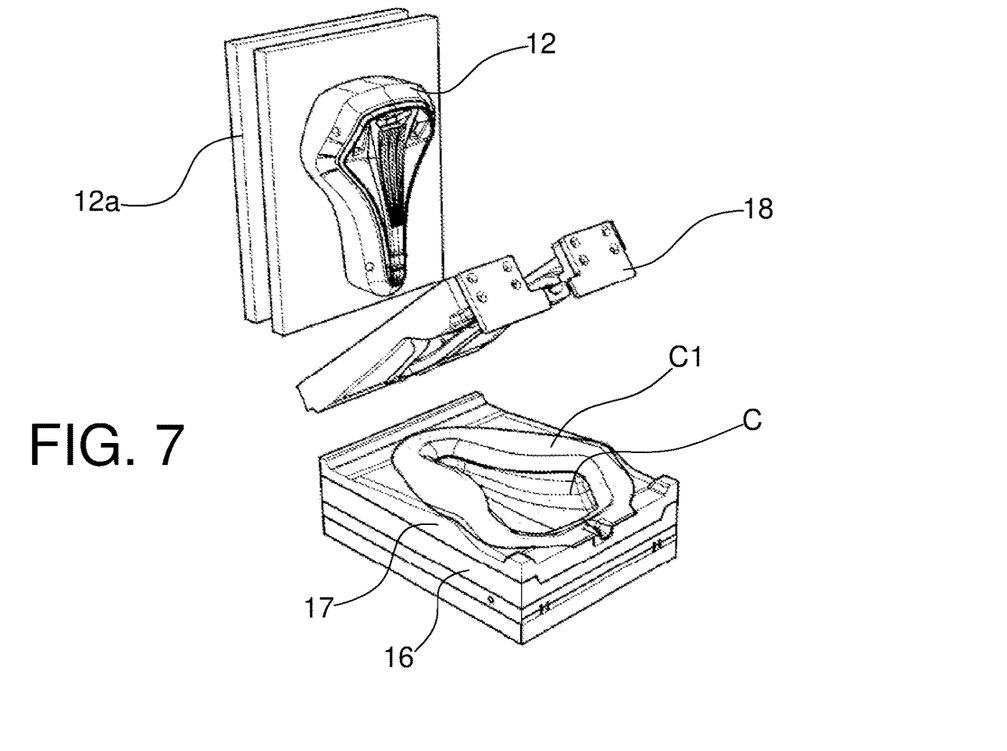

With such mould unit 2, at first with the unit in open condition or opening position (see FIG. 6), the first plate 16 and the second intermediate plate 17 are engaged, and the covering or cover C is positioned in the cavity 15, or rather in the zone thereof defined by the female part, with a respective peripheral section C1 partially lying on the surface of the intermediate plate 17 distal from and not engaged with the first plate 16 (see FIG. 7).

Figure 8:
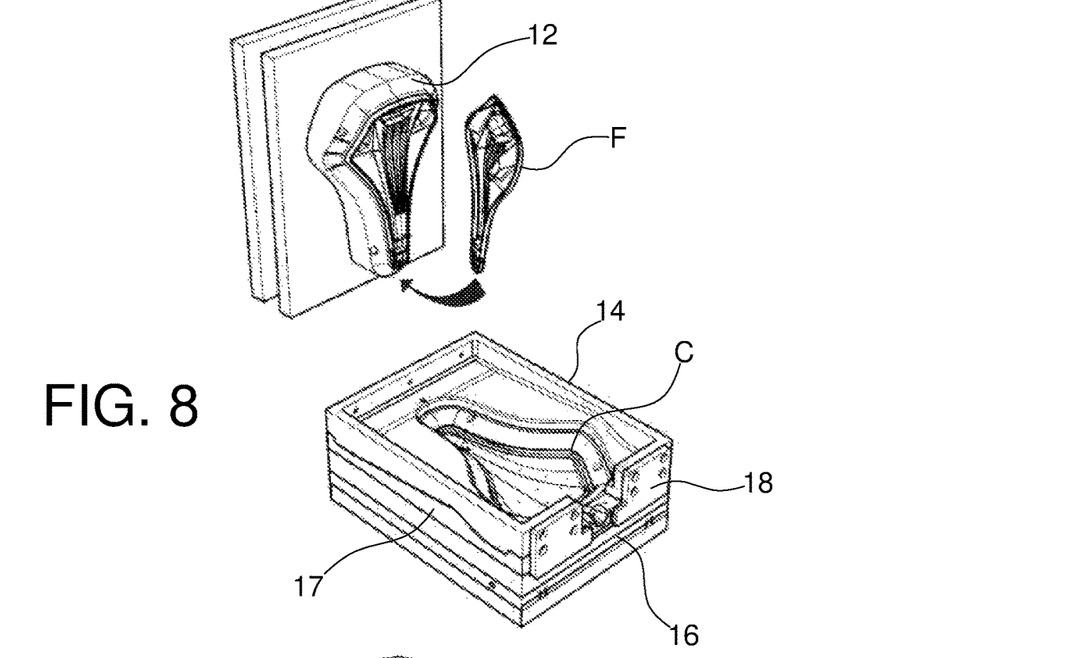

At this point, the third plate 18 and/or the group consisting of the first 16 and the second 17 plates are operated, so as to engage the third plate 18 against the second plate 17 and thereby tighten the peripheral section C1 of the covering or cover C therebetween, and then the source of suction or vacuum is activated, so as to engage the covering C to the walls defining the impression or cavity, or rather the first impression or cavity. The material which must form the padding P is then poured or inserted above the cover or covering C (see FIGS. 7 and 8).

Figure 9:
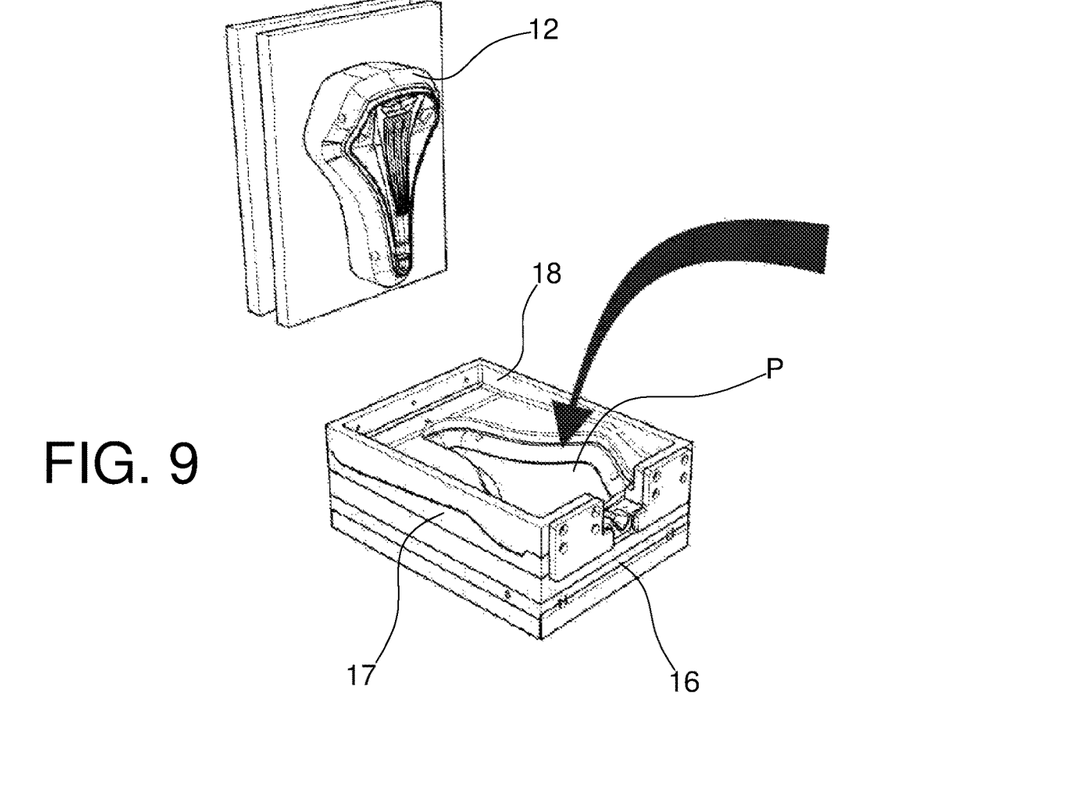

Later, after the engagement of the felt F on a first male component 12, the latter is brought against the female part 14 and so as to close a corresponding first mould impression (see FIG. 9) with the padding material between the shell F and the covering C, and then the mixture or padding material P reacts by filling partly the first impression or cavity, thereby obtaining a moulded padding P. The mould impression during this moulding step can be completely identical to the impression or second impression or cavity 15, except for the edge section which, when the mould unit 2 is closed, does not have a space or zone for inserting or injecting a material intended to form a peripheral section, e.g. an annular one, for protecting the edge E of a saddle.

Figure 10:
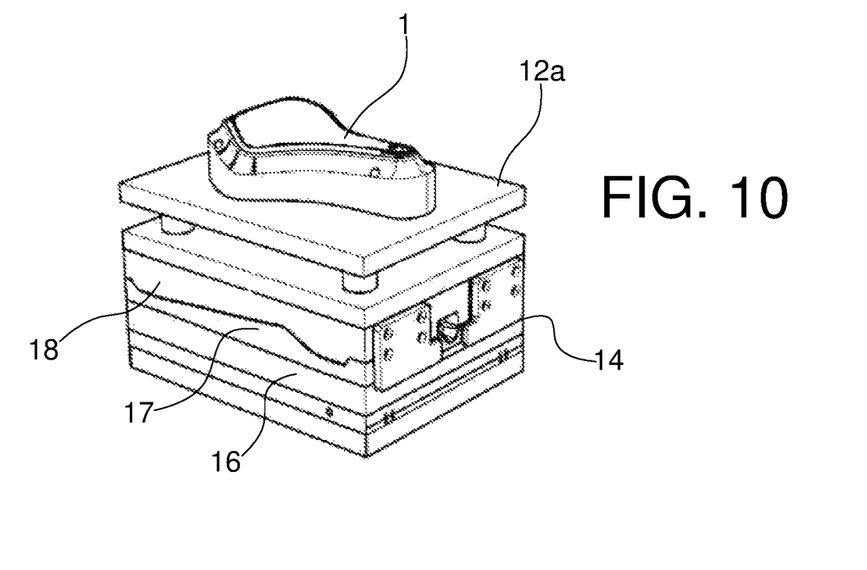

At the end of this first moulding step, the mould unit is opened and the first male component 12 is moved away from the partially formed saddle (see FIG. 10). In this step, the felt F is adhered to the padding P and is not removed together with the first male component 12.

Figure 11:
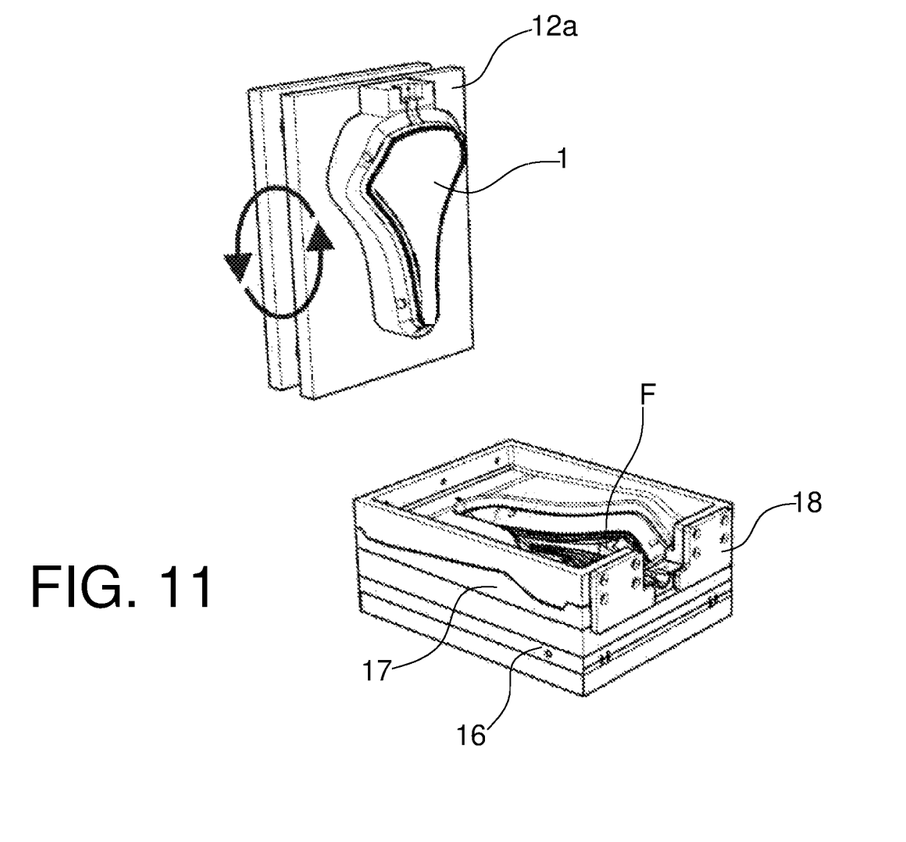
Figure 12:
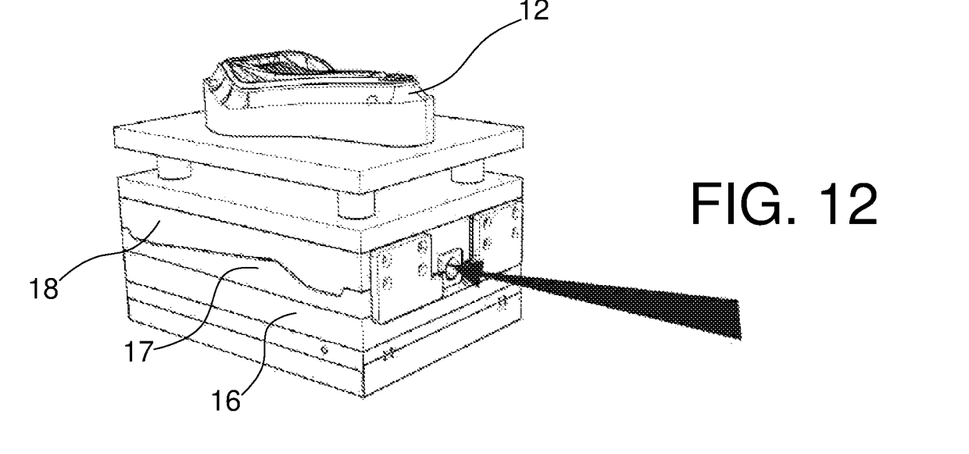

At this point, if desired, after turning (see FIG. 11) the support plate of the male components 1, 12, the second male component 1 with the insert(s) 5 or the first male component 12 to which one or more inserts 5 have been applied is brought in engagement and abutment against the felt F, and the abutment and engagement edge 4a is brought in engagement and abutment against the edge of the second intermediate plate 17 (see FIG. 12).

In this condition, at the lower, in use, edge of the saddle SA, between the second male component 1 and the second plate 17 a space or zone IZ is delimited for conveying material to obtain a sealing edge on the perimeter of the saddle SA.

Figure 13:
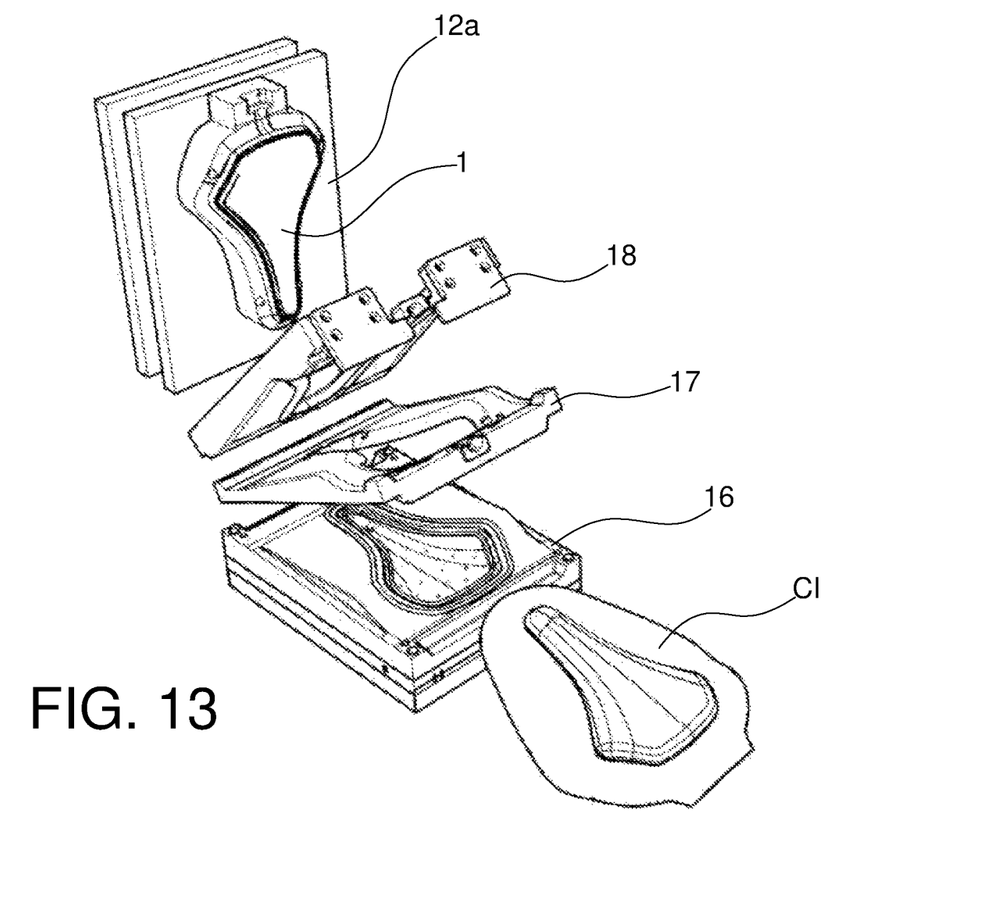

The material is then injected into the mould unit, e.g. by means of the channel or conveying nozzle portions 14a, so as to insert it into the space or zone IZ, and then a second moulding step is performed, after which, at the end of the moulding, the mould unit 2 is opened, and the saddle SA is extracted, therefore proceeding to trim the exceeding covering C (see FIG. 13).

As will be understood, thanks to a second male component 1 according to the present invention, during the step of obtaining a sealing edge on the perimeter of the saddle, it is not necessary to provide a soft gasket to ensure a sealing between the felt F and the second male component 1, since the male component 1 comprises, inter alia, an insert 5 which replicates or mates to the felt F practically uniformly and completely, with no decoupling or lack of contact points.

Moreover, since the insert 5 is made of softer material than the conventional male components, it is able to appropriately absorb the deformations of the felt F during the moulding, or rather during the introduction of the material (usually polyurethane) to form a sealing edge on the perimeter of the saddle, thus serving as a gasket.

This should be clearly considered in combination with the fact that the inner, or moulding, or mould impression or cavity 15 delimiting surface 10 is made internally or centrally by a softer part 10a defined by the insert or contact layer 5 and externally by a harder part 10b defined by the abutment and engagement edge 4a, and with the fact that in closing condition of the moulding unit 2, a segment of the outer portion 10b of the inner surface 10 delimiting the moulding impression 15 or rather an edge of the moulding impression 15 is neither in contact with respective portions or walls of the female part 14, nor with the felt F.

On the basis of the aspects now recalled, once the male component 1 has been closed close and against the female part 14 of the respective molding unit 2, a space or zone IZ is delimited for insertion or injection of a material designed to constitute a sealing edge or a peripheral portion, for example annular, for protecting the edge E of a saddle, which space or zone IZ is defined by the outer portion 10b of the internal surface 10 in a first material harder than the second material of the insert 5.

This therefore ensures a rapid and effective moulding process, with the use of fewer components than in the previous solutions.

Figure 14:
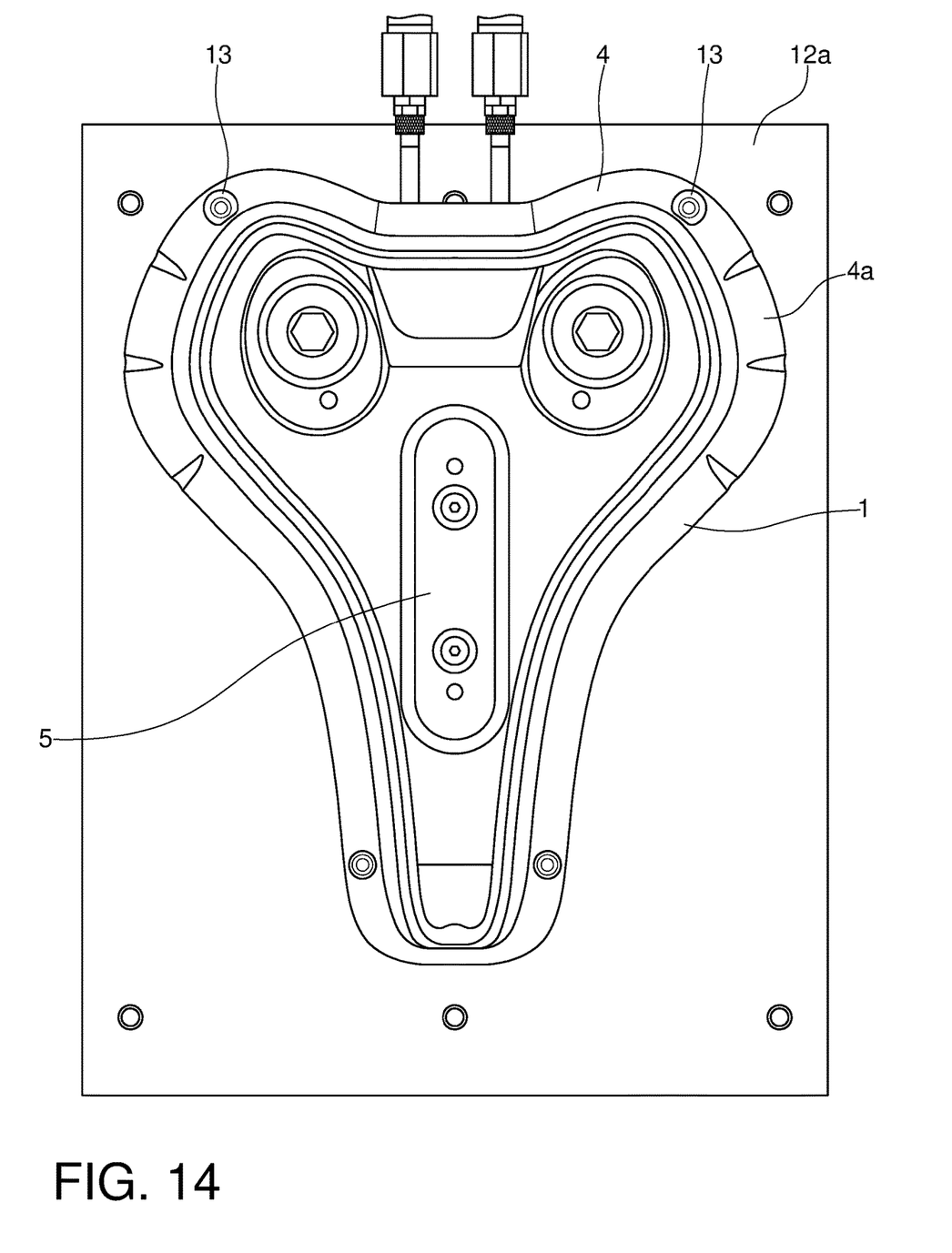
FIG. 14 illustrates another male component according to the present invention on a respective plate.

Referring now to FIG. 14, another male component or second male component 1 according to the present invention similar to the one described above, yet having an insert 5 only at a central or intermediate zone of the component 1 itself has been illustrated.

In this case, the insert or contact layer 5 is designed to come into contact during moulding only with a central or intermediate portion of a felt or shell F for a saddle SA to be moulded, so as to absorb any deformations thereof, and preventing the entrance of a moulding substance or foam between the felt F and the insert or contact layer 5, and thus reducing the dirt of the foam around the hole in the centre of the felt F.

It will therefore be understood that a male component according to the present invention could have inserts placed even in positions other than those described and illustrated above, and, if desired, also with different configurations.

In any case, the insert(s) 5 are made of a second softer and more yielding material than the first material, and ensure a substantial adhesion for a respective step to a component of the saddle to be produced, or even to a part of a female component, thus achieving a better sealingness and cleanliness.

In this case, the central or intermediate portion 10a defined by the free surface of the insert or contact layer 5 can constitute 5% to 40%, preferably 10% to 30% of the inner surface 10.

Modifications and variations of the invention are possible within the scope of protection defined by the claims.

The invention claimed is:

1. A male component or punch for a mould unit delimiting a mould cavity for producing a vehicle saddle, said male component having a main base body made of a first material, wherein said male component comprises at least one insert or contact layer formed or applied over said main base body, said at least one insert or contact layer being made of a second softer or more yielding material than said first material, said at least one insert or contact layer delimiting at least one central or intermediate portion of an inner surface delimiting a surface of said male component, wherein the surface of the male component is intended to be engaged and abutted to a felt or shell (F) for a saddle (SA) to be moulded, wherein said main base body comprises an abutment and engagement edge for a female component of the mould unit, said abutment and engagement edge surrounding said at least one insert or contact layer, and said abutment and engagement edge comprising at least a portion in contact with the mould cavity, wherein said inner surface comprises an outer portion defined by the abutment and engagement edge and said at least one central or intermediate portion enclosed in the zone delimited by the abutment and engagement edge and at least partly defined by a free surface of said at least one insert or contact layer, wherein the at least one insert or contact layer does not become a part of the saddle (SA) to be moulded.

2. The male component according to claim 1, wherein said insert or contact layer is made of a material selected from the group consisting of polyurethane resin or silicone.

3. The male component according to claim 1, wherein said insert or contact layer has a hardness ranging from 40 to 80 ShA.

4. The male component according to claim 1, wherein said insert or contact layer has a thickness ranging from 3 to 70 mm.

5. The male component according to claim 1, wherein said main base body is made of resin, including a polyester resin or an epoxy resin, charged with carbon or glass fibres or metal powders, or made of metal or a metal alloy.

6. The male component according to claim 1, wherein said main base body has a hardness ranging from 90 to 100 Shore A.

7. The male component according to claim 1, wherein the central or intermediate portion defined by the free surface of the insert or contact layer is 5% to 100% of the inner surface.

8. The male component according to claim 7, wherein said central or intermediate portion defined by the free surface of the insert or contact layer constitute 5% to 40%, or 50% to 90%, of said inner surface.

9. The male component according to claim 1, wherein said main base body delimits a bowl or recessed zone (BZ) for positioning and engaging, moulding, gluing or injecting said at least one insert or contact layer, and wherein said at least one insert or contact layer is, in use, inserted or housed within the bowl zone.

10. The male component according to claim 1, wherein said at least one insert or contact layer is designed to completely or partly support, during the moulding, a felt or shell (F) for a saddle to be moulded, so as to absorb deformations, if any, and prevent the entrance of a moulding substance or foam between the felt (F) and the insert or contact layer, or between one or more portions of said felt (F) and insert or contact layer.

11. A mould unit for producing a vehicle saddle, comprising a first male part and a second female part, mutually displaceable between at least one opening position of the mould unit, wherein parts of the saddle to be moulded may be arranged in said unit or wherein a saddle moulded in said unit may be removed from said unit, and at least one closing position of the mould unit, wherein the male part and the female part can be coupled in one or more operating positions, so as to delimit at least one mould cavity or impression between them, said male part including the male component according to claim 1.

12. The mould unit according to claim 11, wherein said male part comprises a first male component and a second male component which can be used in subsequent steps of a moulding process.

13. The mould unit according to claim 11, wherein said male component comprises a main base body defining an abutment and engagement edge for said female part, said abutment and engagement edge enclosing or surrounding said insert or contact layer.

14. The mould unit according to claim 11, wherein in said closing position, a segment of the outer portion of the inner surface delimiting an edge of the mould impression, is not in contact with respective sections or walls of the female part.

15. The mould unit according to claim 11, wherein, in the closing condition of the male component close to and against said female part of the mould unit and with components of a saddle to be moulded inside the mould impression, an area or zone for inserting or injecting a material intended to form a sealing edge or a peripheral portion, for protecting an edge of said saddle is thus delimited.

16. A method for producing a vehicle saddle, comprising the following steps:
providing a mould unit for producing a vehicle saddle, said mould unit comprising a first male part and a second female part, mutually displaceable between at least one opening position of the mould unit, wherein parts of a saddle to be moulded are arranged in said mould unit or wherein a saddle moulded in said mould unit may be removed from said mould unit, and at least one closing position of the mould unit, wherein the male part and the female part can be coupled in one or more operating positions, so as to delimit at least one mould cavity or impression between them,
said male part including a male component or punch for a mould unit delimiting the mould cavity having a main base body made of a first material,
wherein said male component comprises at least one insert or contact layer formed or applied over said main base body, said at least one insert or contact layer being made of a second softer or more yielding material than said first material, said at least one insert or contact layer delimiting at least one central or intermediate portion of an inner surface delimiting a surface of said male component, wherein the surface of the male component is intended to be engaged and abutted to a felt or shell (F) for a saddle (SA) to be moulded,
wherein said main base body comprises an abutment and engagement edge for a female component of the mould unit, said abutment and engagement edge surrounding said at least one insert or contact layer, and said abutment and engagement edge comprising at least a portion in contact with the mould cavity,
wherein said inner surface comprises an outer portion defined by the abutment and engagement edge, and said at least one central or intermediate portion enclosed in the zone delimited by the abutment and engagement edge and at least partly defined by a free surface of said at least one insert or contact layer,
wherein the at least one insert or contact layer does not become a part of the saddle (SA) to be moulded;
arranging the mould unit in an opening position,
engaging a first plate and a second intermediate plate of said female part and disposing a cover or covering in a cavity, or rather in a zone thereof defined by the first plate, with a corresponding peripheral portion of the cover partially lying on a surface of the second intermediate plate distal from and not engaged with the first plate;
actuating a third plate and/or the group consisting of the first and second intermediate plate, so as to engage the third plate against the second intermediate plate and thus mutually clamp the peripheral portion of the cover or covering;
activating a suction or vacuum source, so as to constrain the cover to walls of said first plate defining said impression or cavity;
pouring or inserting a material for padding of the saddle over the cover or covering;
after engagement of a felt with a first male component, bringing the latter close to the female part and closing a corresponding mould impression with the padding material tightened between the shell and the cover, and subsequently the padding mixture or material reacts by filling the mould cavity, thus obtaining a moulded padding;
upon completion of this first moulding step, opening the mould unit and removing the first male component from a partially formed saddle, with the felt being attached to the padding and not being removed together with the first male component;
bringing a second male component with the insert or said first male component to which the insert has been applied in engagement and abutment against the felt and with an abutment and engagement edge in engagement and abutment against an edge of the second intermediate plate, so that at a lower, in use, edge of the saddle, between the male component and the second plate an area or zone for injecting a material to obtain a sealing edge on a perimeter of the saddle is delimited;
injecting material into the mould unit so as to insert it into this area or zone, and then performing a second moulding step;
upon completion of the moulding, opening the mould unit and removing the saddle, therefore proceeding, if necessary, to trim an exceeding cover.

17. The method according to claim 16, wherein during said second moulding step, said at least one insert or contact layer supports said felt or shell for a saddle to be moulded, so as to adsorb any deformations and prevent entrance of a moulding substance or foam between the felt and the insert or contact layer.

* * * * *